Oct. 4, 1960                  J. LUND                  2,954,855

ENERGIZING MEANS FOR ONE-WAY CLUTCHES OF THE SPRAG TYPE

Filed Nov. 25, 1957                             2 Sheets-Sheet 1

INVENTOR.
JOHAN LUND
BY
Whittemore Hulbert & Belknap
ATTORNEYS

Oct. 4, 1960  J. LUND  2,954,855
ENERGIZING MEANS FOR ONE-WAY CLUTCHES OF THE SPRAG TYPE
Filed Nov. 25, 1957  2 Sheets-Sheet 2
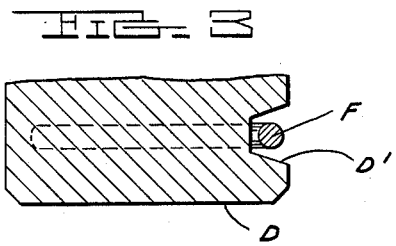
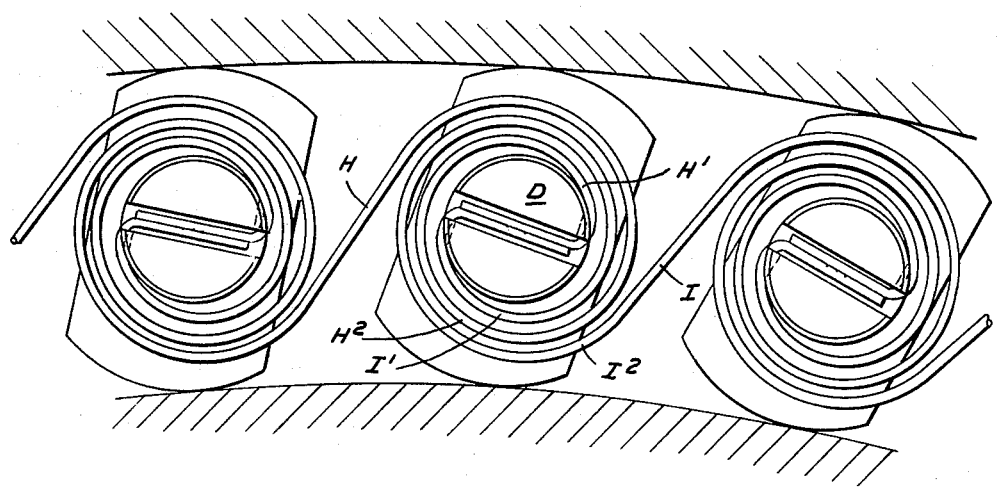
INVENTOR.
JOHAN LUND
BY
ATTORNEYS

United States Patent Office 2,954,855
Patented Oct. 4, 1960

2,954,855

ENERGIZING MEANS FOR ONE-WAY CLUTCHES OF THE SPRAG TYPE

Johan Lund, Detroit, Mich., assignor to Formsprag Company, Van Dyke, Mich., a corporation of Michigan Filed Nov. 25, 1957, Ser. No. 698,759

15 Claims. (Cl. 192—45.1)

The invention relates to one-way clutches of the sprag type and in which the sprags are individually energized by resilient springs wound thereabout. With such construction each spring is attached at one end to the sprag, while at its opposite end it must be anchored to some other member. The springs are biased to further coil or uncoil by their resiliency and thus will impart an energizing torque to the sprag. Various ways of anchoring a spring have heretofore been used. It is however, the object of this invention to simplify the construction by anchoring the coil portion of the spring for one sprag by a coiled portion of the same spring for another sprag. To this end the invention consists in the construction as hereinafter set forth.

In the accompanying drawings:

Fig. 3 is a cross section on line 3—3 of Fig. 1.

Fig. 4 is a diagrammatic representation of a modified form of energizing spring.

Figure 1:
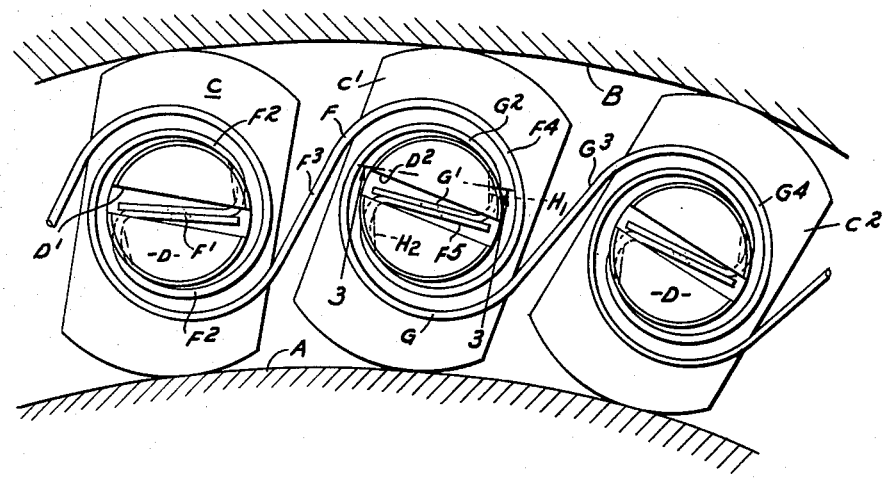
Fig. 1 is an end elevation of a plurality of sprags in a one-way clutch showing energizing means therefor.
Figure 2:
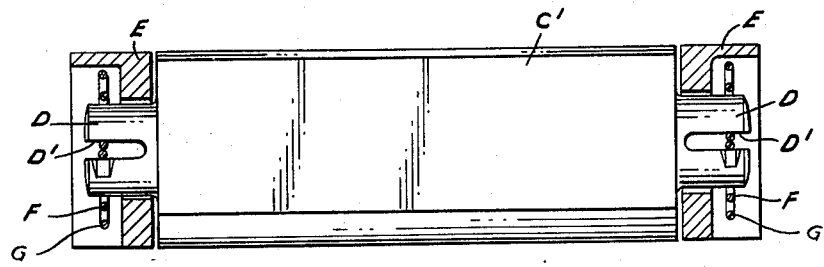
Fig. 2 is a side elevation of one of the sprags and its individual energizing means.

As illustrated, A is a portion of the inner raceway and B a corresponding portion of the outer raceway of a one-way clutch. C, C' and C² are sprags between said raceways which in the whole series (not shown) would surround said raceways. Each sprag has a portion of circular cross section, preferably a trunnion D, at one end thereof pivotally engaging a bearing in a retainer E. The energizing means is formed of a resilient elongated member F having a portion wound around the trunnion D and attached thereto at one end. Such attachment, as shown, is formed by a portion F' extending radially into a slot D' in the trunnion of the sprag C. From the outer end of this portion there is a wound or coiled portion F² surrounding the trunnion for substantially one complete revolution and then extending tangentially in the portion F³. Beyond the portion F³ is a coiled portion F⁴ which surrounds the trunnion of the next adjacent sprag C'. This is similarly attached to the trunnion by a radially extending end portion F⁵ engaging the trunnion slot D². If the member F is biased to further coil or uncoil the portions F² and F⁴, this will impart a torque to each of the sprags C and C' to energize the same. Inasmuch, however, as the two coils react against each other, they are wound reversely and connected to the sprags by portions on opposite sides of their respective sprags in order that the torque will be in the same direction in each. As specifically shown, the tangential portion F³ connects the bottom portion of the coil about sprag C with the top portion of the coil about sprag C'. Also, the radial portions F' and F⁵ enter their respective slots D and D² from opposite ends thereof, being from the right in sprag C and the left in sprag C', as viewed in Fig. 1.

With the construction as thus far described a pair of sprags will be energized by a single member F and other pairs could be similarly energized by additional spring members F. This would leave each pair independent of other pairs, and also while both the sprags C and C' have torque imparted thereto, there is nothing to insure equal rotation in the two members. To avoid such condition, I have devised a construction in which each of the sprags of the series is correspondingly energized by resilient means. This is accomplished by a second spring member G which has a radial portion G' entering the slot D² from the opposite or right end thereof and a coil portion G² extending therefrom around the trunnion to a tangent portion G³ which extends to a coil G⁴ surrounding the trunnion of the third sprag C². Whereas the spring F couples the trunnions of sprags C and C', the spring G couples the trunnions of the sprags C' and C². However, the two springs F and G are identical in construction and have different reference letters applied thereto only for the purpose of avoiding confusion. Each of the sprags will have the coils of two springs wound about its trunnion, but these coils connect respectively with coils on trunnions of sprags in advance and in rear thereof. The two springs for each trunnion may be formed of lighter material than a single spring and still apply the required resilient torque.

To facilitate assembly of the parts, the slot D' in the trunnion D is open at the outer end so that the radial portions F' and G' of the two springs may be entered therein simultaneously with the axial movement of their coils over the trunnion. To avoid accidental disengagement, notches H₁ and H₂ are formed in the trunnions adjacent to opposite ends of the slot D² for engaging portions of the coils respectively of the members F and G. The coils may be sprung into said notches and held therein by their resiliency to prevent disengagement from the trunnions.

The sprags are preferably formed with trunnions at opposite ends of each, and the energizing springs, as above described, are applied to both trunnions. Thus there will be four coils cooperating to energize each sprag.

It may be desirable to increase the flexibility of the spring without diminishing its torque. This may be accomplished by forming it of heavier wire with more than a single convolution in each coil surrounding a trunnion. This is particularly adapted for use where there are only two springs for energizing each sprag. As diagrammatically shown in Fig. 4, the spring H has one convolution H' surrounding the trunnion D and a second convolution H² surrounding a portion of the convolution H'. Also, the spring I has one convolution I' surrounding the trunnion D and a second convolution I² about a portion of the convolution I'. The spiral convolutions of the two springs are intertwined with each other.

What I claim as my invention is:

1. A sprag type clutch comprising retaining means guiding an annular series of sprags between coaxial races, and energizing spring means biasing said sprags in relation to said races, including at least two resilient coils generally paralleling the plane of the sprag series and integrally connected as a pair in end to end relation to one another to extend in the annular direction of said series, said coils each terminating in an end portion encircling a portion of one of said sprags, being wound to react torsionally against one another when biased, and having means connecting the same to the respective sprag portions to impart unidirectional torque thereto.

2. A sprag type clutch comprising retaining means guiding an annular series of sprags between coaxial races, and energizing spring means biasing said sprags in relation to said races, including at least two resilient coils generally paralleling the plane of the sprag series and integrally connected as a pair in end to end relation to one another to extend in the annular direction of said series, said coils each terminating in an end portion encircling a portion of one of said sprags, being wound to react torsionally against one another when biased, and having means connecting the same to the respective sprag portions to impart unidirectional torque thereto, there being pairs of said coils individually biasing the sprags of the series, with the pairs structurally independent of one another.

3. A sprag type clutch comprising retaining means guiding an annular series of sprags between coaxial races, and energizing spring means biasing said sprags in relation to said races, including at least two resilient coils generally paralleling the plane of the sprag series and integrally connected as a pair in end to end relation to one another to extend in the annular direction of said series, said coils each terminating in an end portion encircling a portion of one of said sprags, being wound to react torsionally against one another when biased, and having means connecting the same to the respective sprag portions to impart unidirectional torque thereto, one coil of each pair being connected to a sprag directly in advance of the sprag to which its other coil is connected.

4. A sprag type clutch comprising retaining means guiding an annular series of sprags between coaxial races, and energizing spring means biasing said sprags in relation to said races, including at least two resilient coils generally paralleling the plane of the sprag series and integrally connected as a pair in end to end relation to one another to extend in the annular direction of said series, said coils each terminating in an end portion encircling a portion of one of said sprags, being wound to react torsionally against one another when biased, and having means connecting the same to the respective sprag portions to impart unidirectional torque thereto, there being pairs of said coils individually biasing the sprags of the series, with the pairs structurally independent of one another, one coil of each pair being connected to a sprag directly in advance of the sprag to which its other coil is connected.

5. Individual energizing means for sprags of a one-way clutch, comprising pairs of resilient coils respectively encircling portions of a pair of sprags arranged in circumferential succession, said coils being connected together at one end to react against each other and at their opposite ends connected to said sprags, said coils being biased to impart by their resiliency torque to each sprag, the respective coils of said pairs encircling said respective sprag portions being connected respectively with coils of sprags in advance and in rear thereof, said coils being wound reversely to impart torque in the same direction to each sprag.

6. The construction as in claim 5, in which each sprag has a portion of circular contour, this being the portion of the sprag about which said coil winds.

7. The construction as in claim 5, in which said portion of the sprag about which the coil winds is a trunnion for the mounting of the sprag.

8. The construction as in claim 7, in which the trunnion portion has an open-ended, transversely extending slot therein and the coil has a radially extending end portion insertable in said slot simultaneously with the sleeving of said coil on the trunnion and forming a torque transmitting attachment means.

9. The construction as in claim 8, in which said trunnion is notched adjacent to said slot, into which notch a portion of said coil may be sprung to hold it on said trunnion.

10. The construction as in claim 7, having similar trunnions at opposite ends of the sprags and similar resilient coils thereon.

11. The construction as in claim 5, in which the pairs of coils on said respective sprag portions together form an endless connection between all of the sprags of the series of sprags.

12. The construction as in claim 7, in which each coil has more than a single convolution surrounding the same trunnion.

13. The construction as in claim 12, in which the convolutions of each coil of a pair of springs are spirally intertwined.

14. Individual energizing means for sprags of a one-way clutch, comprising resilient coils respectively encircling portions of sprags arranged in a series, said coils being integrally connected together at one end to react against each other and terminating at opposite end portions connected to said sprags, said coils being biased to impart by their resiliency torque in the same direction to successive sprags of said series.

15. The construction as in claim 14, in which said coils are wound reversely and are connected at their opposite end portions to corresponding end portions of the sprags.

References Cited in the file of this patent

UNITED STATES PATENTS

| | | |
|---|---|---|
| 1,356,007 | Pasquariello | Oct. 19, 1920 |
| 2,181,700 | Leichsenring | Nov. 28, 1939 |
| 2,625,246 | Szady | Jan. 13, 1953 |
| 2,837,189 | Sauzedde | June 3, 1958 |